United States Patent [19]
Kawakami et al.

[11] Patent Number: 5,096,997
[45] Date of Patent: Mar. 17, 1992

[54] COPOLY ARYLATE FROM HYDROQUINONE AND DIHYDROXY DIPHENYL SULFONE

[75] Inventors: James H. Kawakami, Piscataway, N.J.; Lloyd M. Robeson, Macungie, Pa.; Robert J. Cotter, Bernardsville, N.J.

[73] Assignee: Amoco Corporation, Chicago, Ill.

[21] Appl. No.: 83,153

[22] Filed: Aug. 10, 1987

[51] Int. Cl.$^5$ .............................................. C08G 63/18
[52] U.S. Cl. .................................. 528/173; 528/176; 528/194; 528/271
[58] Field of Search ........................ 528/173, 176, 194

[56] References Cited

U.S. PATENT DOCUMENTS 4,599,397  7/1986  Yoshimura et al. ................. 528/173
4,617,368  10/1986  Freitag et al. ....................... 528/173
4,731,433  3/1988  Yatsu et al. ......................... 528/173

OTHER PUBLICATIONS

English Language Translation of Japanese Patent Application 57/164,120, Asada.

Primary Examiner—Harold D. Anderson
Attorney, Agent, or Firm—Matthew R. Hooper; William H. Magidson; Ralph C. Medhurst

[57] ABSTRACT

Described herein are novel polyarylates derived from mixtures of terephthalic and isophthalic acids, hydroquinone and 4,4'-dihydroxydiphenyl sulfone. The instant polyarylates exhibit excellent stress-crack resistance in a wide variety of solvents. Moreover, the materials display very good mechanical and thermal properties.

1 Claim, No Drawings

COPOLY ARYLATE FROM HYDROQUINONE AND DIHYDROXY DIPHENYL SULFONE

FIELD OF THE INVENTION

This invention is directed to novel polyarylates derived from isophthalic and/or terephthalic acids, hydroquinone and 4,4'-dihydroxydiphenyl sulfone. The instant polyarylates exhibit excellent stress-crack resistance in a wide variety of solvents. Moreover, the materials display very good mechanical and thermal properties.

BACKGROUND OF THE INVENTION

Polyarylates or polyesters derived from bisphenol-A and iso/terephthalic acids are tough materials having a continuous use temperature of about 140° C. However, as in the case with many other amorphous thermoplastics, they possess poor solvent and stress-crack resistance. Such polyesters may be represented as having repeating units as shown below:

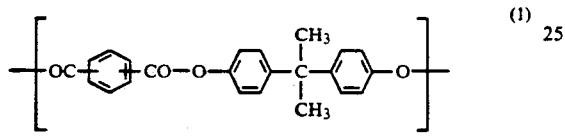
(1)

To improve the solvent and stress-crack resistance, a variety of copolyarylates utilizing other diphenolic and/or acid reactants, were prepared. Thus, significantly improved materials were obtained by substituting part of the bisphenol-A with 4,4'-biphenol, as described in U.S. Pat. No. 4,275,188. Another interesting class of polyarylates are those that contain hydroquinone. Hydroquinone-containing polyarylates are described in, for example, U.S. Pat. Nos. 3,036,990; 3,036,991; 3,036,992; 3,160,605; 3,251,804; and in Japanese Patent Application 74/21,498. Bisphenol-A/hydroquinone iso/terephthalates were first described in Vysokomol. Soedin. 1 (10), 1482 (1959); the same materials can also be found in U.S. Pat. Nos. 3,216,970 and 4,334,053. Compositions containing 5 to 35 mole percent of hydroquinone were transparent and displayed good stress crack and chemical resistance, and good thermal stability. These compositions were described in U.S. Pat. No. 4,064,108. Bisphenol-A/hydroquinone copolyesters were also prepared in U.S. Pat. No. 4,436,894; however, only the isophthalate of bisphenol-A and hydroquinone was described in this latter patent.

Japanese patent application 57/164,120 describes copolyarylates comprising units (2) and (3) in molar ratios of (2)/(2)+(3)=0.2 to 0.8,

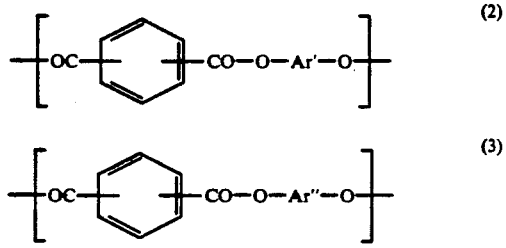
(2)

(3)

where Ar' is a bisphenol residue of the formula

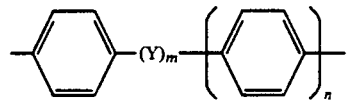

Y being a divalent residue such as —CH$_2$—, —C(CH$_3$)$_2$—, —C(CF$_3$)$_2$—, —O—, —S—, —SO$_2$—, or —CO—; m and n being 0 or 1; with the proviso that n cannot be 0 when m is 0; or of the formula:

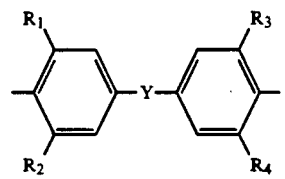

Y being as previously defined; and R$_1$, R$_2$, R$_3$, and R$_4$ being C$_1$ to C$_4$ alkyl, alkoxy or halogen groups, and where Ar'' is

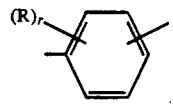

R being a C$_1$ to C$_4$ alkyl, alkoxy or halogen group, and r being an integer of 0 to 4. According to the application, the moiety

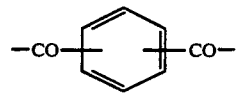

comprises preferably 100 to 90 mole percent of para- and 0 to 10 mole percent of meta-carbonyl groups.

THE INVENTION

It was unexpectedly discovered that copolyarylates based on isophthalic and terephthalic acids, hydroquinone and 4,4'-dihydroxydiphenyl sulfone possess superior stress-crack and chemical resistance. Moreover, these materials show excellent mechanical and thermal properties.

The copolyarylates of the instant invention contain units (4) and (5):

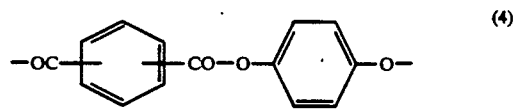
(4)

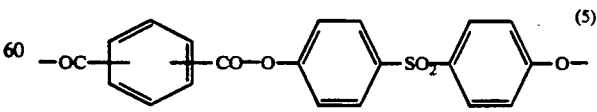
(5)

wherein the molar ratio of units (4) to units (5) may vary within the limits of 5:95 to 95:5, preferably within the limits of 75:25 to 90:10; the ratio of isophthalic to terephthalic acid moieties should be in the range of 100:0 to 50:50, preferably in the range of 95:5 to 75:25.

The outstanding chemical and stress-crack resistance of the copolyesters of the instant invention is unexpected. Indeed, these properties are generally associated with crystalline thermoplastics. The materials of the present invention are amorphous, however; and display the additional quality of being transparent.

Any known polyester forming reactions can be used to make the copolyarylates. These include:

1. the reaction of aromatic diacids with diester derivatives (6), and (7) of the diphenols

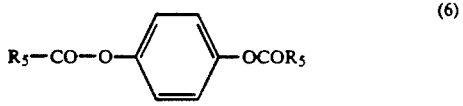

(6)

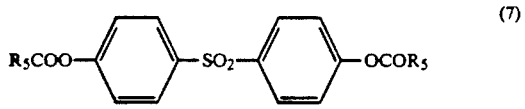

(7)

where $R_5$ is a $C_1$ to $C_{10}$ aliphatic group. The process is hereinafter referred to as the "Diacetate Process";

2. the reaction of the acid chlorides or bromides of isophthalic and terephthalic acids with the diphenols, referred to as the "Acid Chloride Process"; and 3. the reaction of the diaryl esters of the aromatic diacids

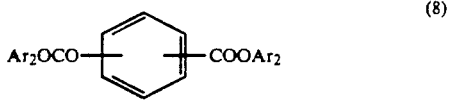

(8)

where $Ar_2$ can be a phenyl, o-tolyl, m-tolyl, p-tolyl, like residues, with the diphenols. The process is hereinafter referred to as the "Diphenate Process".

The polymerizations using the diacetate process first prepare a diester of hydroquinone and of 4,4'-dihydroxydiphenyl sulfone with a monocarboxylic acid. In principle, any monocarboxylic acid can be used; aliphatic $C_1$ to $C_{11}$ acids are preferred and aliphatic $C_1$ to $C_4$ are most preferred. These esters are then reacted under acidolysis conditions with the mixture of isophthalic and terephthalic acids to yield the copolyesters of the instant invention and the monocarboxylic acid, which can be recycled. The two steps, i.e., the preparation of the monocarboxylic acid esters of hydroquinone and of 4,4'-dihydroxydiphenyl sulfone and their polymerization, can be performed separately, or in a one-pot procedure. It is preferred that the intermediate diesters contain <than about 1,500 parts per million of residual acid anhydride prior to polymerization. This procedure, as described in U.S. Pat. No. 4,321,355, yields polyarylates having good color and melt-stability. The acidolysis reaction can be performed in bulk or in the presence of from about 5 to about 60, more preferably from about 25 to about 60, and most preferably, from about 30 to about 60 weight percent, based on the weight of the copolyarylate produced, of a processing aid. The preferred processing aids are a diphenyl ether compound as described in U.S. Pat. Nos. 4,294,956 and 4,296,232; a cycloaliphatic, substituted aromatic or heteroaromatic compound, as described in U.S. Pat. No. 4,294,957; and a halogenated and/or etherated substituted aromatic or heteroaromatic compound as described in U.S. Pat. No. 4,374,239. The polymerization reaction can also be conducted using a slurry process as described in U.S. Pat. No. 4,083,829.

The acidolysis reactions are carried out in the temperature range of about 200° C to about 350° C; preferably in the temperature range of about 250° C to about 325° C. However, lower and higher temperatures may also be used. The reactions can be carried out at atmospheric or subatmospheric pressures; they can also be performed under pressures higher than atmospheric.

The acidolysis reaction generally does not require a catalyst. In some instances, however, the use of an appropriate catalyst may prove advantageous. Typical catalysts include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

Two procedures can be used for the preparation of the instant copolyarylates via the acid chloride process. One is carried out at low temperature and the other at high temperature. In the low temperature technique, polycondensation of the acid chlorides derived from terephthalic and isophthalic acids with hydroquinone and 4,4'-dihydroxydiphenyl sulfone is effected at ambient temperatures in an inert solvent such as methylene chloride, in the presence of a basic catalyst and an acid acceptor. This type of process is described in, for example, U.S. Pat. No. 3,234,168. The condensation may also be performed in the presence of an inorganic acid acceptor, such as $Ca(OH)_2$ suspended in an inert organic solvent, as described in U.S. Pat. No. 3,939,117. A second, immiscible solvent, e.g., water, may be present in these low temperature reactions. This process variant is referred to as the interfacial or phase boundary polymerization. In the interfacial reaction, the diphenols are dissolved in an aqueous alkaline phase. Small quantities, e.g., 0.1 to 1.0 percent by weight (based on the diphenols used) of reducing alkaline substances, such as sodium bisulfite for example, may be added to the aqueous phase. Quaternary ammonium or phosphonium compounds, in amounts ranging from about 0.5 to about 5.0 mole percent based on the diphenols, may be used as the polymerization catalysts. The acid chlorides are dissolved in the organic solvent and the solution is brought into contact with the aqueous alkaline solution which contains the diphenolates. The two phases are vigorously stirred and polymer formation occurs at the interface. Preferred solvents for the low-temperature polymerizations include methylene chloride, chloroform, tri- and tetrachloroethylene, tetrachlorethane, chlorobenzene, the dichlorobenzenes and mixtures of these solvents. Temperatures are generally in the range of 0° to 40° C., preferably in the range of 15° to 30° C.

The high-temperature acid chloride process involves the condensation reaction at elevated temperatures (>100° C.) in high boiling solvents. The reactions may be performed in the absence of catalysts, in which case temperatures in excess of 200° C. are preferred. The polycondensation may also be catalyzed, for example with magnesium, as described in U.S. Pat. No. 3,733,306 and by Matzner and Barclay, J.Appl. Polym. Sci., Vol. 9, pp. 3321-3336 (1965). Another class of catalysts are, for example, the titanate esters described in German Patent Application 1,933,687. Lower temperatures are satisfactory for the catalyzed reactions and are generally in the range of about 110° C. to about 220° C., although higher temperatures may be necessary in some instances.

Inert, high boiling solvents which can be used in the high-temperature process are those that do not react with the starting materials or with the final polyester. Also, the solvents should dissolve the copolyarylate formed. Representative solvents include the chlorinated aromatic hydrocarbons such as chlorobenzene, dichloro-, trichloro-, and tetrachlorobenzenes, chlorinated biphenyls or diphenyl ethers, chlorinated naphthalenes; as well as non-chlorinated aromatics such as terphenyl, benzophenone, ditolylmethane, the dibenzylbenzenes, and the like.

The polymerizations using the diphenate process require first the preparation of a diaryl ester of the isophthalic and terephthalic acids. The group $Ar_2$ is a monovalent aromatic radical and can be derived from any phenol; phenyl or tolyl are preferred. The diaryl esters are then reacted under ester-exchange conditions with the hydroquinone and 4,4'-dihydroxydiphenyl sulfone to give the final copolyarylate. The two steps, i.e., the preparation of the diaryl esters and their polymerization may be performed separately or in a one-pot procedure.

The ester-exchange reaction can be performed in bulk or in the presence of from about 5 to about 60, more preferably from about 25 to about 60, and most preferably, from about 30 to about 60 weight percent, based on the weight of the copolyarylate produced, of a processing aid. The preferred processing aids are a diphenyl ether compound, a cycloaliphatic, substituted aromatic or heteroaromatic compound, or a halogenated and/or etherated substituted aromatic or heteroaromatic compound as described in, for example, U.S. Pat. No. 4,459,384.

It is most preferred to use the diphenyl iso- and terephthalates. The ester-exchange reaction is generally carried out in the temperature range of 200°–350° C. However, lower or higher temperatures may also be used. The reaction can be performed at atmospheric, reduced, or higher than atmospheric pressures. Catalysts, generally compounds containing metals such as the alkali and alkaline earth metals, cerium, manganese, cobalt, zinc, germanium, tin, antimony and bismuth, may be used to accelerate the polymerization. Examples of typical catalysts are the alkali metal phenoxides, hydroxides, and alkoxides.

If desired, a chain stopper can be used to control the molecular weight of the polyarylates obtained. Suitable agents include monohydric phenols or their derivatives, such as p-phenylphenol, and the like and monofunctional carboxylic acid or their derivatives, such as benzoic or naphthoic acids, and the like.

The copolyarylates of the instant invention have a reduced viscosity (RV) of from about 0.5 to greater than about 1.5, preferably from about 0.55 to about 1.2 dl/g as measured in 6:4 by weight mixtures of phenol:1,1,2,2-tetrachloroethane, at a concentration of 1 g/dl., at 25° C.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also reinforcing fibers such as fiberglass, carbon fibers, aromatic polyamide fibers and the like may be used. The polymers may also include additives such as titanium dioxide; thermal stabilizers, ultraviolet light stabilizers, plasticizers, and the like. Moreover, the polymers are also useful as constituents in polyblends, for instance with other polyarylates, poly(butylene terephthalate), poly(ethylene terephthalate), polycarbonates, poly(aryl ethers), poly(aryl ether ketones), polyamides, poly(amide-imides), poly(etherimides), polyimides, poly(ester-carbonates), polymethacrylates, polystyrene, polymeric fluorinated hydrocarbons, various elastomers, polyurethanes, etc.

The polymers of this invention may be fabricated into any desired shape, i.e., moldings, coatings, films, or fibers. They are particularly desirable for molding, for fiber, and for use as electrical insulation for electrical conductors.

Also, the polymers may be woven into monofilament threads which are then formed into industrial fabrics by methods well known in the art as exemplified by U.S. Pat. No. 4,359,501. Further, the polymers may be used to mold gears, bearings and the like.

EXAMPLES

The following examples serve to give specific illustrations of the practice of this invention but they are not intended in any way to limit the scope of this invention.

Preparation of the Copolyarylates via the Diacetate Process—General Procedure Isophthalic acid (x moles), terephthalic acid (y moles), hydroquinone diacetate (x' moles) and 4,4'-dihydroxydiphenyl sulfone (Bisphenol S) diacetate (y' moles) were combined in a reactor along with sufficient diphenyl ether to achieve a solution containing about 50 to 60 weight percent of solids. It is preferred to use equimolar amounts of acetate and acid or a slight excess of the acetate reactants, i.e., (x+y) should preferably be equal to or slightly less than (x'+y'). The reactor contents were heated to 270° C. for a period of from about 8 to about 14 hours under a high nitrogen purge. The progress of the reaction can be monitored by monitoring the distillation of acetic acid and the increase in the viscosity of the reaction mixture. After cooling, the reactor contents were pulverized and extracted for 24 hours with acetone. The extraction procedure was repeated four times. The residual polyester was then dried until constant weight.

Using the general procedure outlined above, the following polyesters were prepared.

| Polymer No. | Molar Ratio Hydroquinone:Bisphenol S | Molar Ratio Isophthalic:Terephthalic Acids | RV* (dl/g) |
|---|---|---|---|
| 1 | 75:25 | 75:25 | 0.64 |
| 2 | 75:25 | 80:20 | 0.66 |
| 3 | 75:25 | 70:30 | 0.59 |
| 4 | 80:20 | 75:25 | 0.63 |

*measured in a mixture of 6:4 by weight of phenol:1,1,2,2-tetrachloroethane, at a concentration of 1 g/dl, at 25° C.

Polymer Characterization and Evaluation

Samples of the polyarylates were dried prior to compression molding. Samples were compression molded in a 4 inch×4 inch×20 mil cavity mold at 320°–330° C. Test specimens of ⅛ inch width were shear cut from these moldings. The mechanical properties were determined by placing the specimen in the jaws of an Instron testing apparatus. One percent secant modulus, tensile strength, and ultimate elongation were determined by a procedure similar to the procedure of ASTM D-638. Pendulum impact strength values were determined on the ⅛ inch wide samples according to a procedure noted in U.S. Pat. No. 4,503,121.

Environmental stress rupture results were obtained by placing the above test specimens in grips attached to weighted lever arms. A cotton swab was attached to the center of the specimen and saturated with the organic environment to be tested. Aluminum foil was wrapped around the cotton swab to prevent evaporation and cooling. The time to rupture was recorded. If the sample did not rupture after a certain length of time, the sample was removed from the grips and observed for cracks and crazes. Also, the sample was bent over 180° to determine the ductility. A brittle failure indicated damage to the specimen and was reported.

Modulus-temperature and resilience-temperature data were determined according to a procedure noted on pages 126 and 127 in "Polymer-Polymer Miscibility", O. Olabisi, L. M. Robeson, and M. T. Shaw, Academic Press, New York, 1979. The glass transition temperature of the polyarylates was determined from the minimum of the resilience-temperature data as discussed in that reference.

The properties of the polyarylates are listed in Table I.

TABLE I

| Properties of the Polyarylates | | |
|---|---|---|
| Polymer No. | 1A* | 2 |
| 1% Secant Modulus (psi) | 213,000 | 218,000 |
| Tensile Strength (psi) | 9,220 | 9,650 |
| % Elongation | 9.7 | 17 |
| Pendulum Impact Strength, (ft. lbs/in³) | 45 | 103 |
| Tg (°C.) | 195 | 190 |

*Same composition as that of Polymer No. 1, except that the RV was 0.69 dl/g.

The data of Table I show that the polymers of the instant invention are tough materials; their glass-transition temperatures are comparable to those of the bisphenol-A based polyarylates which are in the range of 180° to 210° C.

Environmental stress-rupture data are shown in Table II.

TABLE II

| Environmental Stress-Rupture Data[1] | | | | |
|---|---|---|---|---|
| Polymer | Toluene | Acetone | Ethyl Acetate | Trichloro-Ethylene |
| A[2] | <1 sec, R | <1 sec, R | <1 sec, R | 32 sec, R |
| B[3] | 4 hrs., C and B | 0.20 hrs., R | 0.71 hrs., R | 0.12 hrs., R |
| 1 | 3 hrs, NCNB | 3 hrs, NCNB | 1.09 hrs., R | 2.48 hrs., R |
| 2 | 4 hrs., NCNB | 0.38 hrs., R | 2 hrs., C and B | 2 hrs., C and B |
| 3 | 4 hrs, NCNB | 0.27 hrs., R | 0.56 hrs., R | 2 hrs., NCNB |
| 4 | 5 hrs., C and B | 0.34 hrs., R | 2 hrs., C and B | 0.36 hrs., R |

[1]All experiments were performed using a stress of 2,000 psi.
[2]Polyarylate from bisphenol-A and a 1:1 mixture of isophthalic and terephthalic acids; RV = 0.66 dl/g.
[3]Polyarylate from hydroquinone:bisphenol-A (molar ratio = 75:25) and isophthalic:terephthalic acids (molar ratio = 75:25); RV = 0.74 dl/g.
R = rupture;
C and B = crazed and brittle;
NCNB = not crazed, not brittle.

The data of the above table show unequivocally that the polyarylates of the instant invention display superior stress-crack resistance to some of the most agressive solvents.

What is claimed is:

1. A copolyarylate consisting of units of the following formulas:

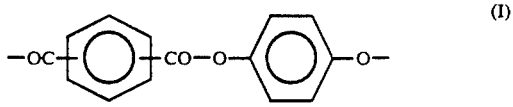
(I)

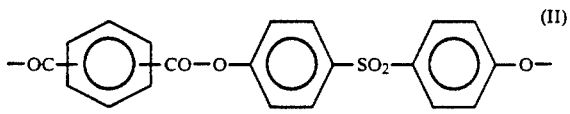
(II)

wherein the molar ratio of unit (I) to unit (II) is 75:25 to 90:10 and wherein the moiety

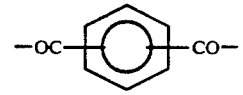

in units (I) and (II) is derived from isophthalic acid, or a mixture of isophthalic acid and terephthalic acid, such that the mole ratio of units derived from isophthalic acid to units derived from terephthalic acid is in the range of from about 100:0 to 75:25.

* * * * *